Sept. 25, 1962

C. L. JACOBSEN 3,056,021

ILLUMINATION DEVICE

Filed July 10, 1959

INVENTOR.
Chester L. Jacobsen
BY
Christy, Parmelee & Strickland
ATTORNEYS

United States Patent Office 3,056,021
Patented Sept. 25, 1962

3,056,021
ILLUMINATION DEVICE
Chester L. Jacobsen, Bethel Park, Pa., assignor to Jacobsen Products, Inc., Bethel Park, Pa., a corporation of Pennsylvania
Filed July 10, 1959, Ser. No. 826,185
2 Claims. (Cl. 240—46.51)

This invention is for an illuminating device, and particularly for an illuminating device utilizing electric incandescent bulbs, but in which the light is filtered to give it a quality simulating a gas lamp.

For achieving desirable artistic, aesthetic or architectural effects, gas lamps using incandescent mantles have come into extensive use, especially for outdoor use and at entrances where the subdued light of a gas lamp at the top of a post or entrance-way, reminiscent of the turn of the century, is much in vogue. The use of gas lamps is restricted, however, to locations where gas is available, and their use inside public gathering places, even in stores for display, is commonly prohibited by fire regulations. Additionally, while the soft light of an incandescent mantle is normally adequate, there are times when stronger illumination is desirable.

The present invention has for a primary object to provide a lamp or illuminating device in which the appearance and quality of a gas lamp is simulated, but in which an incandescent electric bulb is used.

A further object of the invention is to provide a lamp which, while simulating a gas lamp, also contains a second complementary but concealed more powerful source of illumination for use on occasions when more adequate illumination is required.

My invention has other objects and advantages which will be more fully apparent from the following detailed description in conjunction with the accompanying drawing, in which.

Figure 1:
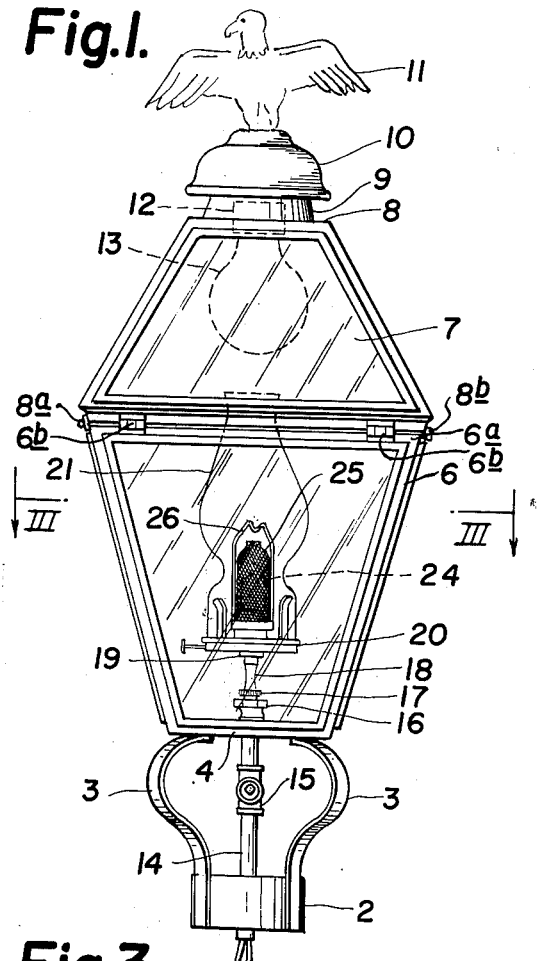
FIG. 1 is a side elevation of an illuminating fixture embodying my invention.
Figure 2:
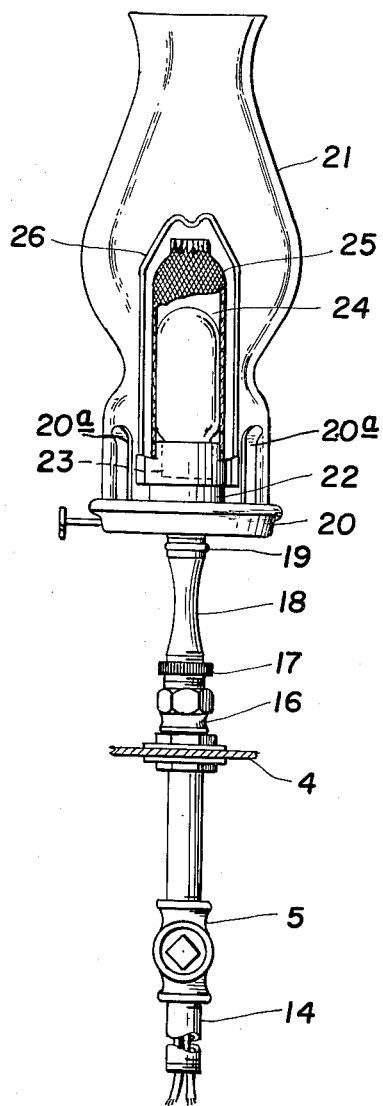
FIG. 2 is a detail view in vertical section of the lamp portion of the fixture removed from the enclosure.
Figure 3:
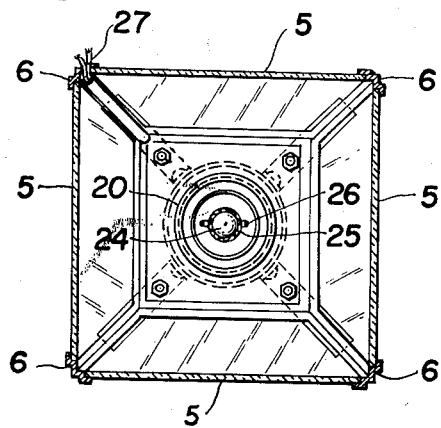
FIG. 3 is a transverse section in the plane of line III—III of FIG. 1.

In the drawings I have shown a fixture designed especially for out-of-door use on a post to simulate an old-time street lamp post. The general construction of the enclosure for the illuminating fixture is old and will be only briefly described. At the bottom is a ring 2 designed to be clamped to the top of the post. Curved spaced straps 3 are secured to the ring, and they in turn support the square base 4 of the enclosure. The enclosure has four clear glass panels 5, each carried in a metal frame 6, the sides of the frames forming the four corners of the enclosure. One panel, as is usual in such fixtures, is here shown as a hinged door, affording access to the interior, the hinges being designated 6b, but since the entire top of the structure is also hinged, as hereinafter described, this hinging of one panel may be eliminated. The panels are wider at the top than at the bottom. The tops of the frames of the four panels, designated 6a, form a horizontal square frame. Customarily there are four other glass panels 7 extending upwardly and sloping inwardly, these panels being sloped more steeply and reversely to the main panels, and at their upper ends they join a metal hood 8, these upper panels likewise being of glass surrounded by metal. The hood customarily has a central flue or vent 9 over which is a wind deflector 10 surmounted usually by an ornament 11. The entire hood assembly, including the panels 7 and their framing, is hinged at 8a to swing in a vertical arc, and a latch is indicated at 8b.

According to the present invention the glass in the lower panels is clear, affording a view of the interior, but the upper panels are non-transparent, being opaque, translucent, opalescent or frosted, preferably frosted. In the flue 9 is a standard incandescent lamp socket 12 in which is a lamp 13, which is a bright lamp, perhaps around 100 watts.

Passing up through the center of the ring 2 into the base is a pipe 14, like ordinary iron gas pipe, with a simulated key valve 15, but which may actually be a rotary snap switch. Above the base are connections and nipples 16—17, and from the top of the nipple 17 is an extension pipe, preferably shaped like a gas burner mixer tube, 18. At the top of the tube 18 is a fitment 19 on which is a flanged plate 20, from which extend fingers 20c designed to resiliently receive the base of a conventional transparent lamp chimney 21. There is a tubular extension 22 projecting up from this plate in which is a small electric bulb socket 23 in which is an open filament incandescent lamp bulb 24, the bulb being of clear glass. By "open filament" I refer to that well-known type of lamp bulb in which the filament has several separately spaced vertically-extending strands engaged over supporting hooks inside the bulb, as distinguished from the more conventional bulb having a compact filament that concentrates the light source in a small space.

Fitted over the extension 22 and enclosing the lamp bulb is a conventional upright incandescent gas mantle 25 with its usual wire supports 26, the mantle being of a close mesh fine, woven screen-like texture forming a generally cylindrical hollow shell constricted at its top and pervious to air, made of fine white strands, such as the mantle commonly known as a "Welsbach" type of mantle. The clear glass bulb is desirable, rather than a frosted bulb, because the illusion of a heated mantle produced by a flame within the mantle is greatly heightened.

The bulb 24 is a low wattage, relatively low candlepower lamp, and the mantle conceals the outline of the lamp completely and filters the light so that while the mantle itself never incandesces as with a gas burner, it imparts a quality to the light transmitted through it which so closely simulates light emitted from the mantle itself that only close observation can detect the difference. Hence the combination of the open filament type of clear glass lamp bulb and the incandescent mantle as a screen and filter gives the subdued glow considered desirable for architectural and aesthetic purposes and reminiscent of the "gas light era." The fixture may be used where only electricity is available. The style of the fixture is such that one expects it to be of a type where a gas lamp would be used, thereby heightening the illusion, particularly with the provision of a gas vent at the top of the fixture, the lamp chimney and the burner simulating parts.

The pipes and mixer tube leading up to the bulb 24 are protective enclosures for the electric wires (not shown). One pair of wires, however, is brought from the central support, up the corner framing of the fixture to the lamp bulb 13, the wires, designated 17, being substantially invisible from the exterior of the fixture. When it is desired to increase the illumination, as when guests are arriving or departing, the bulb 13 will be lighted. While the bulb will be invisible, the light from this more powerful lamp will be diffused through the celar and frosted glass panels to still maintain the illusion of a single light source, but with greatly increased illumination.

While I have shown one particular form and design of lighting fixture, the invention is applicable to a wide variety of lighting devices for indoor and outdoor use.

I claim as my invention:

1. An illuminating device comprising a burner simulating fixture having a central pipe through which wires are passed, an incandescent lamp socket at the top of the pipe, an enclosure about the socket, an incandescent lamp bulb in the socket, a vertical cylindrical mantle of fine white mesh supported on the enclosure about the socket and entirely surrounding and enclosing the incandescent lamp bulb for filtering the light from said bulb and giving the illusion of being luminous, an enclosure into which the upper portion of the pipe with the mantle and bulb extends, the enclosure being generally square in horizontal section with the sides thereof comprising four transparent glass panels sloping upwardly and outwardly through which a portion of the pipe and the mantle are visible and a metal frame structure supporting the panels, a top structure comprising four non-transparent other panels extending upwardly and inwardly from the tops of the first four panels, a metal hood at the tops of the second four panels and forming the top of the enclosure, a second lamp socket mounted in the hood with an incandescent lamp bulb therein entirely above the lower edges of the second-named other panels so as to be concealed thereby but from which light may be transmitted downwardly and outwardly through the transparent panels to provide a substantially concealed supplemental illumination for the area around but below the fixture.

2. An illuminating device comprising a burner simulating fixture having a central pipe through which wires are passed, an incandescent lamp socket at the top of the pipe, an enclosure about the socket, an incandescent lamp bulb in the socket, a vertical cylindrical mantle of fine white mesh supported on the enclosure about the socket and entirely surrounding and enclosing the incandescent lamp bulb for filtering the light from said bulb and giving the illusion of being luminous, an enclosure into which the upper portion of the pipe with the mantle and bulb extends, said enclosure comprising a transparent lower section through which the mantle is visible, and an upper section extending upwardly from said lower transparent section, and a hood at the top of said upper section forming the top of the enclosure, a second lamp socket mounted in said hood with an incandescent lamp bulb therein entirely above the lower edge of the said upper section so as to be concealed thereby but from which light may be transmitted downwardly and outwardly through the transparent lower section to provide a substantially concealed supplemental illumination for the area around but below the fixture.

References Cited in the file of this patent
UNITED STATES PATENTS

| | | |
|---|---|---|
| 1,261,613 | Pratt | Apr. 28, 1918 |
| 1,272,746 | White | July 16, 1918 |
| 1,740,747 | Price | Dec. 24, 1929 |
| 1,787,279 | Mageoch | Dec. 30, 1930 |
| 1,833,122 | Oliver | Nov. 24, 1931 |
| 1,967,140 | Ainslie | July 14, 1934 |
| 2,014,191 | Stock | Sept. 10, 1935 |
| 2,254,664 | Quinlan | Sept. 2, 1941 |
| 2,820,887 | McInnis | Jan. 21, 1958 |